UNITED STATES PATENT OFFICE.

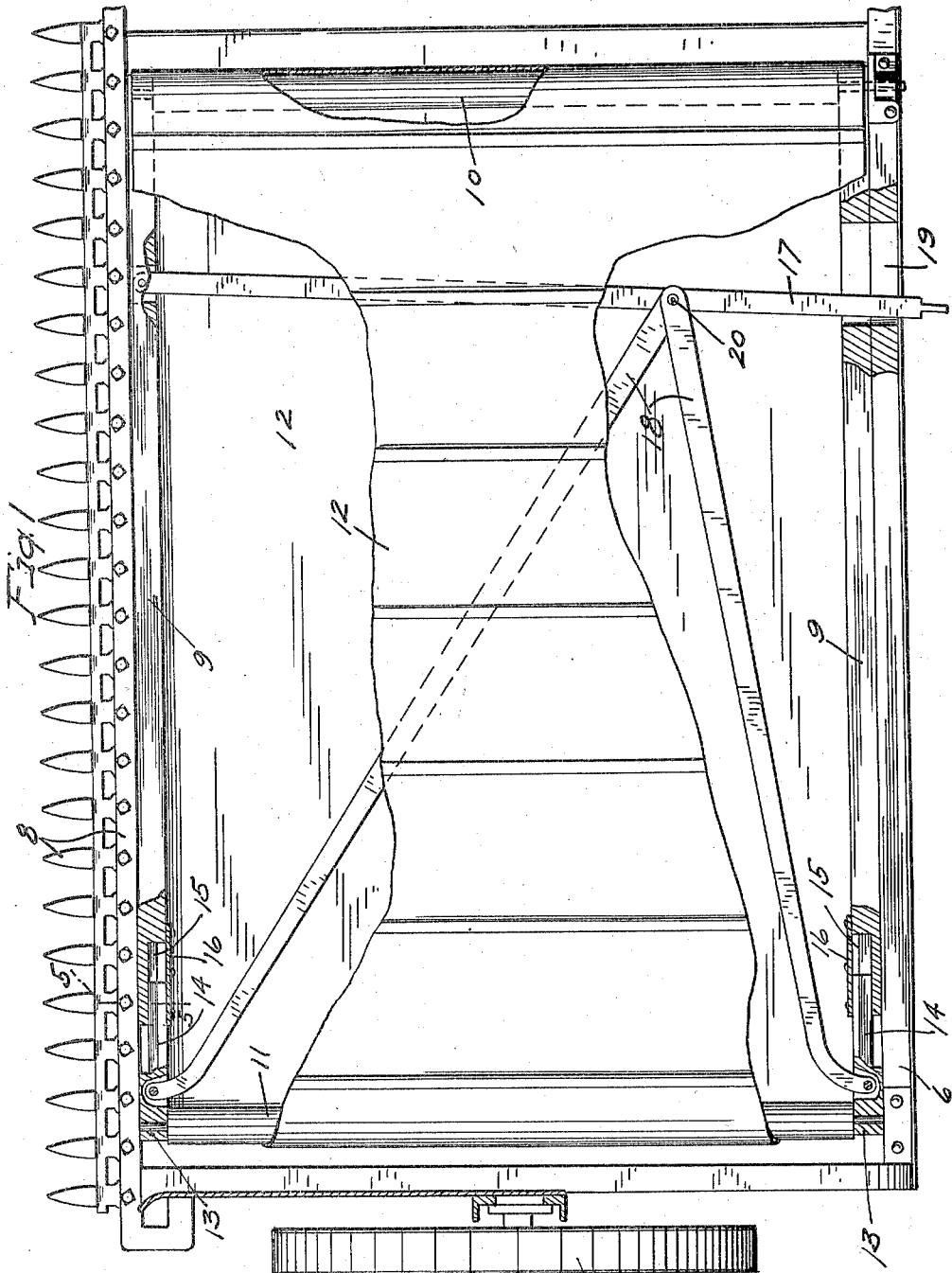

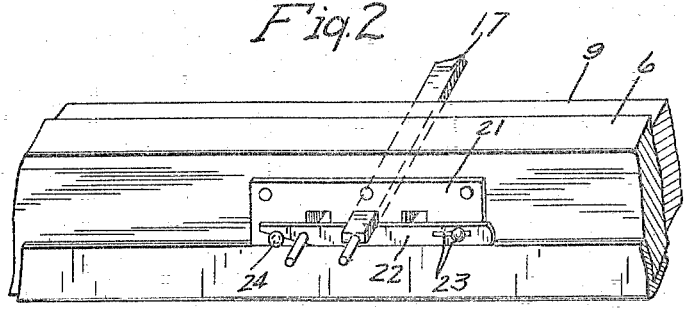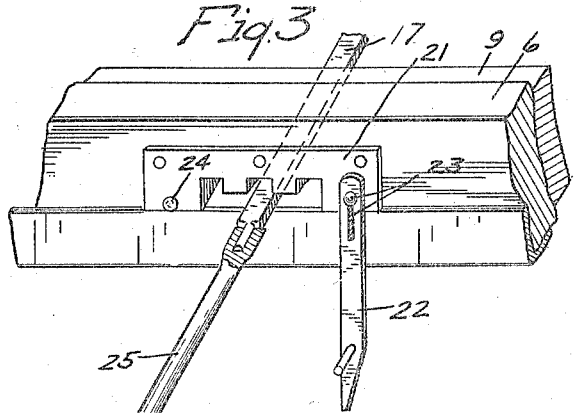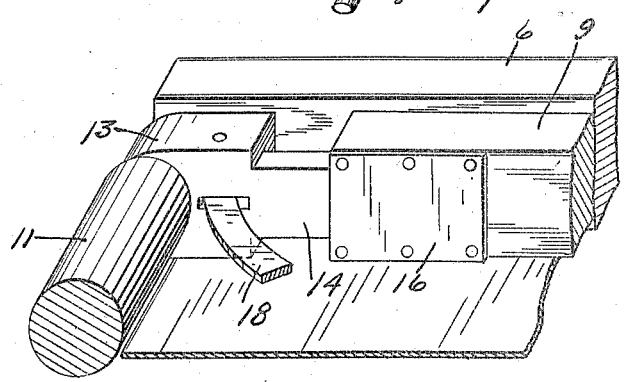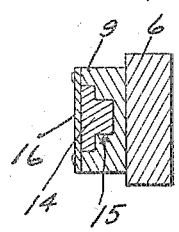

JENS JOHNSON, OF ROLLAG, MINNESOTA.

TENSION DEVICE FOR ENDLESS-BELT CARRIERS.

1,290,222. Specification of Letters Patent. Patented Jan. 7, 1919.

Application filed June 10, 1918. Serial No. 239,100.

*To all whom it may concern:*

Be it known that I, JENS JOHNSON, a citizen of the United States, residing at Rollag, in the county of Clay and State of Minnesota, have invented certain new and useful Improvements in Tension Devices for Endless-Belt Carriers; and I do hereby declare the following to be a full, clear, and exact description of the invention, such as will enable others skilled in the art to which it appertains to make and use the same.

My invention relates to tension devices for endless belts or apron carriers intended for general use, but especially adapted for use in connection with the platform canvases of harvesters.

To the above end, generally stated, the invention consists of the novel devices and combinations of devices hereinafter described and defined in the claim.

In the accompanying drawings, which illustrate the invention, like characters indicate like parts throughout the several views.

Referring to the drawings,

Figure 1 is a view partly in plan and partly in horizontal section illustrating the improved tension device incorporated in a harvester for adjusting the platform canvas thereof;

Fig. 2 is a fragmentary perspective view of the lever and locking device therefor;

Fig. 3 is a view corresponding to Fig. 2, with the exception that the locking device for the lever is released;

Fig. 4 is a fragmentary perspective view of the front portion of the platform frame, connected guide rail and idle roller; and Fig. 5 is a detail view in section taken on the line 5—5 of Fig. 1, on an enlarged scale.

Of the parts of the harvester illustrated, it is only necessary to note the frame 6, grain wheel 7, guard-equipped cutter bar 8, canvas or apron guide rails 9, driven roller 10, idle roller 11, and slat-equipped platform canvas or apron 12, arranged to run over the rollers 10 and 11, with its upper longitudinal edges supported on said guide rails.

The driven roller 10 is journaled in suitable bearings on the frame 6 and the idle roller 11 is journaled in the outer ends 13 of the guide rails 9, and which outer ends are longitudinally adjustable with respect to the guide rails proper. To adjustably connect the rail ends 13 to the guide rails proper, the inner portions thereof are reduced to form horizontally disposed T-shaped shanks 14, which are slidably mounted in correspondingly formed seats 15 in the inner faces of the adjoining ends of said guide rails proper. Cover plates 16, detachably secured by bolts, or otherwise, to the guide rails 9, are provided for the seats 15 and hold the shanks 14 against lateral separation therefrom.

To simultaneously adjust the rail ends 13 and thereby move the idle roller 11 parallel toward and from the driven roller 10, I provide a lever 17 and a pair of links 18. One end of the lever 17 is fulcrumed to the front guide rail 9 between the upper and lower sections of the apron 12, and the other or free end thereof projects through a horizontal slot 19 formed in the rear guide rail 9 and frame 6. The links 18 have one of their ends connected to the lever 17 by a common pivot pin 20, while their other or diverging ends are pivoted, one to each of the rail ends 13.

A lock plate 21, having a plurality of depending longitudinally spaced notches extending into the slot 19, is secured to the frame 6 for holding the lever 17 in different set positions. The lever 17 is held interlocked with any one of the notches in the lock plate 21 by a hand-piece latch bar 22 connected at one end to said plate by a slot and pin connection 23 and having its other or free end beveled for engagement with a headed pin 24, also secured to said plate. By swinging the latch bar 22 under the lever 17 and then moving the same endwise into engagement with the pin 24, the lever 17 is thereby held interlocked in one of the notches in the lock plate 21, as shown in Fig. 2. To increase the operating length of the lever 17, the same is provided with a removable outer end extension 25.

From the above description, it is evident that by setting the lever 17 in different adjustments, the tension of the platform apron 12 may be varied, at will.

What I claim is:—

The combination with a pair of side members having longitudinally adjustable bearings, of a roller journaled in the bearings, a lever fulcrumed to one of the side members and working through a slot in the other thereof, means for securing the lever in different adjustments, and a pair of diverging links having their inner ends pivoted to the lever and their outer ends pivoted one to each of the bearings for imparting parallel movements to the roller.

In testimony whereof I affix my signature in presence of two witnesses.

JENS JOHNSON.

Witnesses:
W. GEO. HAMMETT,
E. J. MORTON.